US012167527B1

(12) United States Patent
Xu et al.

(10) Patent No.: US 12,167,527 B1
(45) **Date of Patent: *Dec. 10, 2024**

(54) CONTINUOUS LARGE AREA COLD ATMOSPHERIC PRESSURE PLASMA SHEET SOURCE

(71) Applicant: The Board of Trustees of the University of Alabama, for and on behalf of the University of Alabama, in Huntsville, Huntsville, AL (US)

(72) Inventors: Kunning Gabriel Xu, Brownsboro, AL (US); Ryan Patrick Gott, Summerville, SC (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,242

(22) Filed: Sep. 28, 2023

Related U.S. Application Data

(63) Continuation of application No. 17/033,219, filed on Sep. 25, 2020, now Pat. No. 11,812,540.

(60) Provisional application No. 62/908,245, filed on Sep. 30, 2019.

(51) Int. Cl.
*H05H 1/24* (2006.01)

(52) U.S. Cl.
CPC ................................ *H05H 1/2439* (2021.05)

(58) Field of Classification Search
None
See application file for complete search history.

(56) References Cited

U.S. PATENT DOCUMENTS

| | | | | |
|---|---|---|---|---|
| 8,928,230 | B2 * | 1/2015 | Watson | A61M 16/06 315/111.21 |
| 8,994,271 | B2 * | 3/2015 | Kindel | A61B 18/042 315/111.21 |
| 9,006,976 | B2 * | 4/2015 | Watson | H05H 1/46 315/111.21 |
| 9,384,947 | B2 * | 7/2016 | Watson | A61M 15/02 |
| 9,406,485 | B1 * | 8/2016 | Cheng | H01J 37/32091 |
| 9,414,478 | B2 * | 8/2016 | Schultz | H05H 1/2439 |

(Continued)

OTHER PUBLICATIONS

Xu, et al., U.S. Appl. No. 16/153,297, entitled, “Microplasma-Based Heaterless, Insertless Cathode,” filed Oct. 5, 2018.

*Primary Examiner* — Srinivas Sathiraju
(74) *Attorney, Agent, or Firm* — Butler Snow LLP; Jon E. Holland

(57) ABSTRACT

The present disclosure is generally directed to a plasma sheet source and methods of using same. The plasma sheet source includes a cylindrical electrode having a conductive cylindrical core surrounded by a dielectric material, a plurality of channels configured to direct gas from a gas inlet to the electrode, and a plasma outlet positioned below the electrode. Gas is introduced to the plasma sheet source and directed toward the electrode, which when powered by pulsed direct current, produces plasma as the gas ionizes. The produced plasma is then directed out of the plasma outlet to a specimen for treatment of the specimen. Notably, the plasma exiting the plasma outlet is in the form of a plasma sheet that is at approximately room temperature.

25 Claims, 11 Drawing Sheets

(56) References Cited

U.S. PATENT DOCUMENTS

| | | | | |
|---|---|---|---|---|
| 9,460,884 | B2 * | 10/2016 | Hopwood | H05H 1/2406 |
| 9,521,736 | B2 * | 12/2016 | Jacofsky | A61N 1/44 |
| 9,550,694 | B2 * | 1/2017 | Boughton | C03B 5/185 |
| 9,558,918 | B2 * | 1/2017 | Watson | H05H 1/46 |
| 9,764,954 | B2 * | 9/2017 | Walters | C09C 1/44 |
| 9,934,929 | B1 * | 4/2018 | Martinez | H01J 27/146 |
| 10,032,609 | B1 * | 7/2018 | Cheng | C23C 16/513 |
| 10,064,263 | B2 * | 8/2018 | Watson | A61L 2/00 |
| 10,167,220 | B2 * | 1/2019 | Boughton | H05B 7/22 |
| 10,269,526 | B2 * | 4/2019 | Martinez | H01J 27/146 |
| 10,480,493 | B2 * | 11/2019 | Hofer | H05H 1/54 |
| 10,672,602 | B2 * | 6/2020 | Williams | H01J 49/26 |
| 10,919,649 | B2 * | 2/2021 | Conversano | B64G 1/405 |
| 11,042,027 | B2 * | 6/2021 | Neophytou | H01T 19/00 |
| 11,812,540 | B1 * | 11/2023 | Xu | H05H 1/2439 |
| 2005/0012441 | A1 * | 1/2005 | Schulteiss | H01J 1/025 313/141 |
| 2009/0066212 | A1 * | 3/2009 | Matacotta | H01J 1/025 313/231.31 |
| 2010/0175987 | A1 * | 7/2010 | Creyghton | H05H 1/2441 422/186.29 |
| 2011/0165333 | A1 * | 7/2011 | Gasworth | C23C 16/52 427/446 |
| 2012/0080995 | A1 * | 4/2012 | Yamamura | H01T 13/16 445/7 |
| 2014/0188071 | A1 * | 7/2014 | Jacofsky | A61B 17/3421 604/501 |
| 2015/0094647 | A1 * | 4/2015 | Kalghatgi | A61K 8/06 604/23 |
| 2015/0157870 | A1 * | 6/2015 | Kalghatgi | H05H 1/2406 604/23 |
| 2016/0089545 | A1 * | 3/2016 | Juluri | A61B 18/042 604/23 |
| 2016/0121134 | A1 * | 5/2016 | Kalghatgi | A61N 1/44 604/23 |
| 2017/0032944 | A1 * | 2/2017 | Jacofsky | H01J 37/32082 |
| 2017/0181260 | A1 * | 6/2017 | Corke | H05H 1/2439 |
| 2018/0226217 | A1 * | 8/2018 | Martinez | H01J 27/146 |

* cited by examiner

CONTINUOUS LARGE AREA COLD ATMOSPHERIC PRESSURE PLASMA SHEET SOURCE

RELATED APPLICATION

This application is a continuation of and claims priority to U.S. patent application Ser. No. 17/033,219, entitled "Continuous Large Area Cold Atmospheric Pressure Plasma Sheet Source" and filed on Sep. 25, 2020, which is incorporated herein by reference. U.S. application Ser. No. 17/033,219 claims priority to U.S. Provisional Patent Application No. 62/908,245 filed on Sep. 30, 2019, titled "Continuous Large Area Cold Atmospheric Pressure Plasma Sheet Source," the entire contents of which are incorporated herein.

STATEMENT REGARDING FEDERALLY SPONSORED RESEARCH OR DEVELOPMENT

This invention was made with Government support under OIA-1655280 awarded by the National Science Foundation. The Government has certain rights in the invention.

TECHNICAL FIELD

The present disclosure is directed to a large area plasma sheet source for the treatment of a specimen surface.

RELATED ART

Atmospheric pressure plasma is utilized in many industries as a means of activating, cleaning, or decontaminating surfaces, or changing surface chemistry. Further, as the plasma that interacts with a specimen surface may be at or near room temperature, it is compatible with the treatment of living tissues and objects. For example, a noble gas "working gas" mixed with nitrogen has been used to produce plasma, which in turn is used to treat seeds. The treated seeds have been shown to have enhanced germination and seedling growth, as well as decontaminated surfaces. Other applications for atmospheric pressure plasma include water treatment, bacteria inactivation, surface activation, adhesion enhancement, plasma cleaning, and surface modifications.

Atmospheric pressure plasma is typically utilized as plasma jets, which are thin jets that have diameters ranging from microns to millimeters and lengths of a few centimeters. The effective treatment area of each jet is very small due to its small diameter, leading to the production of arrays of plasma jets that can treat larger areas. However, these jet arrays have the disadvantage of creating non-uniformly treated surfaces since the jet arrays have discontinuous plasma production. The present disclosure is directed to a plasma sheet source, which produces atmospheric pressure plasma and applies the plasma to a specimen as a long continuous plasma sheet. In this way, specimen treatment area is expanded from that of an individual jet without the heterogeneity of jet arrays.

SUMMARY OF THE DISCLOSURE

The present disclosure is directed to a plasma sheet source and methods of treating a specimen using the plasma sheet source. In one aspect of the disclosure, there is provided a plasma sheet source with a gas inlet for receiving gas and an electrode with a conductive core covered with a dielectric material, and the electrode is configured to generate an electrical field. The plasma sheet source further includes a body having a plurality of channels for directing gas from the gas inlet through the electrical field generated by the electrode to an elongated outlet of the body, so that the electrical field converts the gas to a plasma sheet output from the elongated outlet.

In some embodiments, the gas includes a noble gas and the dielectric material is quartz. In some embodiments, the body has a first cavity for receiving gas from the gas inlet and a second cavity in which the electrode is located, and each of the channels extends from the first cavity to the second cavity. In some embodiments, the plurality of channels includes at least a first channel and a second channel, and the first channel is parallel to the second channel. In some embodiments, the electrode is elongated and has a longitudinal axis that is parallel with the elongated outlet. In some instances, the electrode is electrically connected to a power source configured to transmit pulsed direct current to the electrode. In some embodiments, the plasma sheet is at room temperature and the plasma sheet source is configured to form the plasma at atmospheric pressure.

In another aspect of the disclosure, there is provided a system for generating a plasma sheet. The system includes at least one gas source, a power source, and a plasma sheet source connected to the gas source. The plasma sheet source has an electrode and a plurality of channels for receiving gas from the at least one gas source and directing the gas past the electrode and through an electrical field generated by the electrode. The electrode is connected to the power source and the power source is configured to apply power to the electrode for generating the electrical field at a strength sufficient for converting the gas into the plasma sheet that egresses the plasma sheet source through the elongated outlet. The electrode has a conductive core covered with a dielectric material.

In some embodiments, the gas includes a noble gas and the dielectric material is quartz. In some embodiments, the plasma sheet source has a first cavity for receiving the gas and a second cavity in which the electrode is positioned, and the plurality of channels includes at least a first channel and a second channel, and each of the first channel and the second channel extends from the first cavity to the second cavity. In some instances, the first channel is parallel to the second channel. In some embodiments, the electrode is elongated and has a longitudinal axis that is parallel with the elongated outlet. In some embodiments, the power source is configured to apply pulsed direct current to the electrode. In some embodiments, the plasma sheet source is configured to form the plasma at atmospheric pressure.

In yet another aspect of the disclosure, there is provided a method for generating a plasma sheet. The method includes receiving gas within a first cavity of a plasma sheet source having a plurality of channels, generating an electrical field with an electrode in a second cavity of the plasma sheet source, directing the gas from the first cavity through the plurality of channels to the second cavity so that the electrical field converts the gas into the plasma sheet, and emitting the plasma sheet from the plasma sheet source through an elongated cavity.

In some embodiments, the method further includes directing the plasma sheet to a specimen for treating the specimen. In some embodiments, the electrode is elongated and has a longitudinal axis that is parallel with the elongated outlet and the electrical field is generated using pulsed direct current. In some embodiments, the plurality of channels includes at least a first channel and a second channel, and each of the first channel and the second channel extends from the first cavity to the second cavity, and the first channel is parallel to the second channel.

A further understanding of the nature and advantages of the present invention will be realized by reference to the remaining portions of the specification and the drawings.

BRIEF DESCRIPTION OF DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure is generally directed to plasma sheet sources and methods of using same for the treatment of specimen surfaces. The plasma sheet source allows plasma to be applied to a surface of a specimen with a larger application area than typical plasma jets afford. The plasma sheet source additionally improves upon plasma jet arrays in that it results in a generally uniform treatment across the sheet. Furthermore, while plasma jet arrays require multiple devices with multiple power sources, the present plasma sheet source may utilize a single device powered by a single power source. The use of a dielectric-coated electrode produces plasma that is at or near room temperature, so that the presently disclosed plasma sheet sources are compatible with biological specimen treatment.

As used herein and known in the art, the term "plasma" refers to a gas comprised of ions and/or free electrons. Plasma may be partially or fully ionized and may be formed by heating a neutral gas or subjecting a neutral gas to an electrical field.

As used herein and known in the art, the term "atmospheric pressure plasma" refers to plasma that is maintained at a pressure approximately equal to atmospheric pressure. No vacuum or pressurized containers are required to maintain atmospheric pressure plasma.

Figure 1:
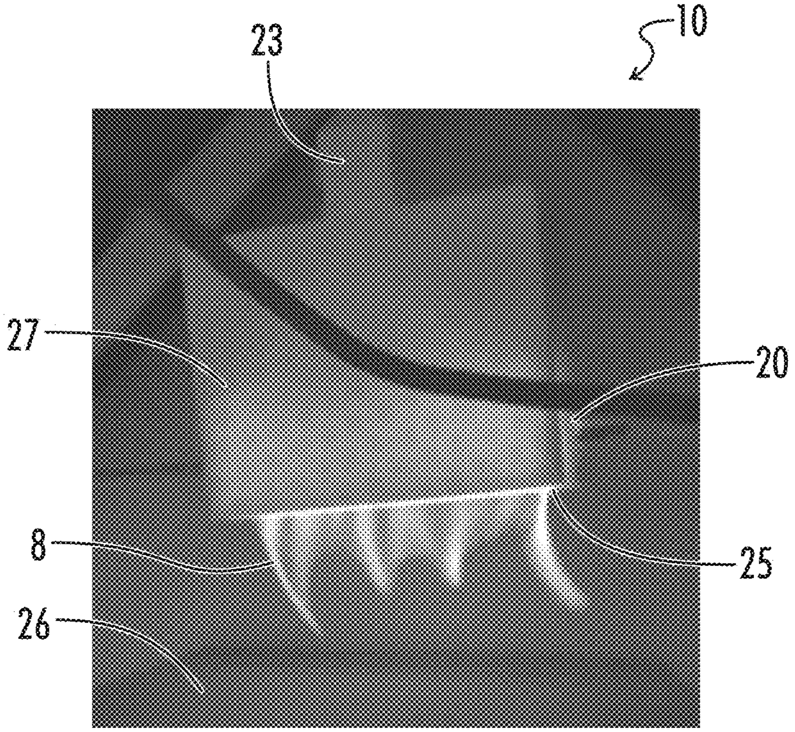
FIG. 1 is a diagram depicting an embodiment of a plasma sheet source in accordance with the present disclosure.

A plasma sheet source 10 is shown in FIG. 1. Plasma sheet source 10 includes a gas inlet 23 through which a gas 9 (FIG. 6) enters a body 27 of plasma sheet source 10. The body 27 has channels 18 (FIG. 3) through which gas 9 flows and is directed toward an electrode 20 (FIG. 2) within the body 27, at which point the gas 9 is ionized by the electrical field produced by electrode 20 and becomes plasma 8. As plasma 8 exits plasma sheet source 10, it is directed into the form of a plasma sheet at a plasma outlet 25. Plasma 8 is then configured to treat the surface of a specimen 26. In the embodiment depicted by FIG. 1, the gas inlet extends from one side of the body 27, and the opposite side of the body 27 has an outlet 25 (FIG. 3) through which the plasma 8 exits the body 27. The outlet 25 may be an elongated slit extending along the side of the body 27, though other configurations of the gas inlet 23, body 27, and outlet 25 are possible in other embodiments.

Plasma sheet source 10 may be manufactured using additive manufacturing techniques or injection molding. In some instances, plasma sheet source 10 is 3D printed and comprises polylactic acid (PLA), though other non-conductive materials and manufacturing techniques may be used. For instance, the plasma sheet source 10 may be composed of polyethylene terephthalate (PET), high-density polyethylene (HDPE), polyvinyl alcohol (PVA), nylon, and acrylonitrile butadiene styrene (ABS). Components or features of plasma sheet source 10 are in some instances produced as a unitary construction, though in other instances not depicted the components or features are manufactured separately and attached using commercially available attachment means.

Figure 2:
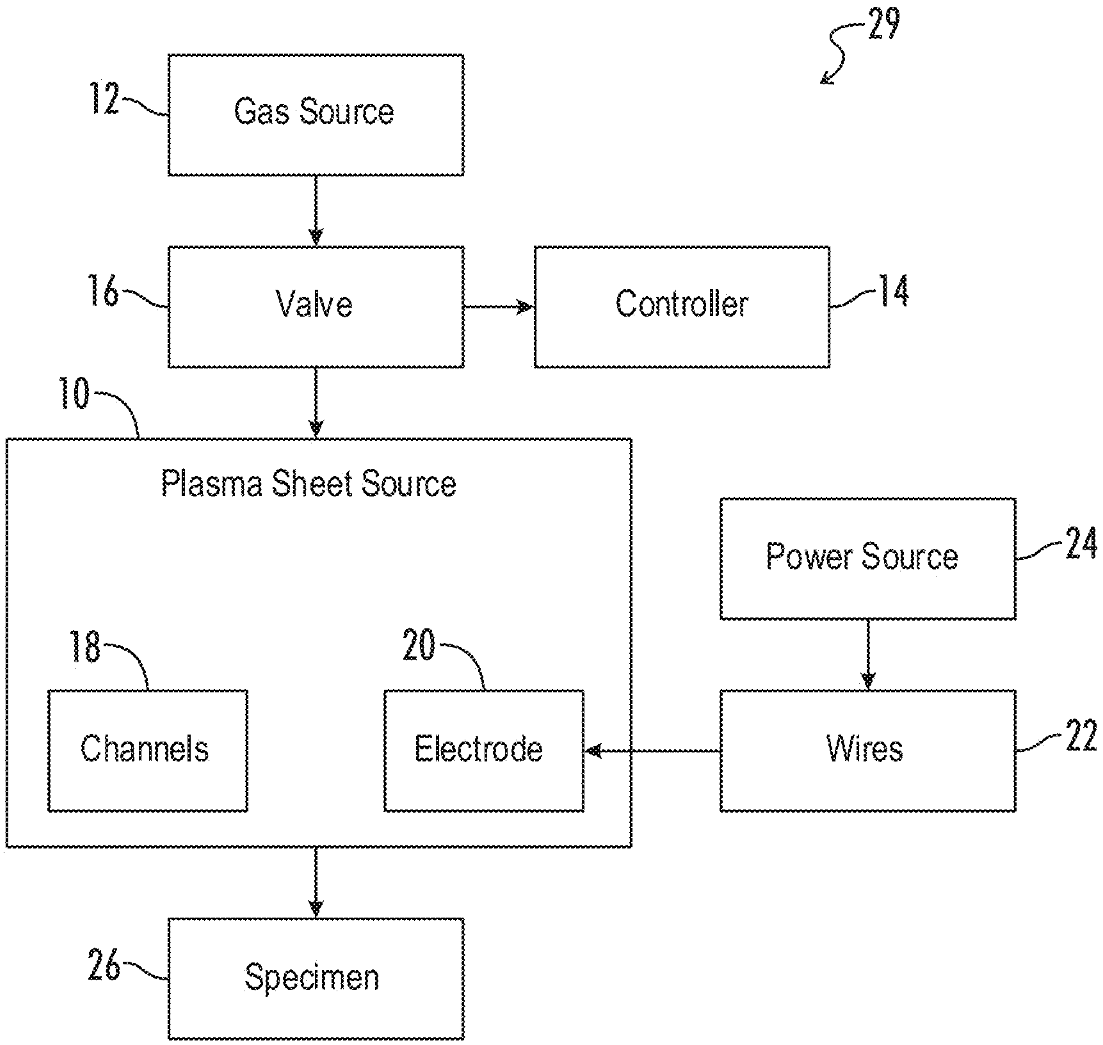
FIG. 2 is a block diagram illustrating an embodiment of a system for applying a plasma sheet to a specimen.
Figure 3:
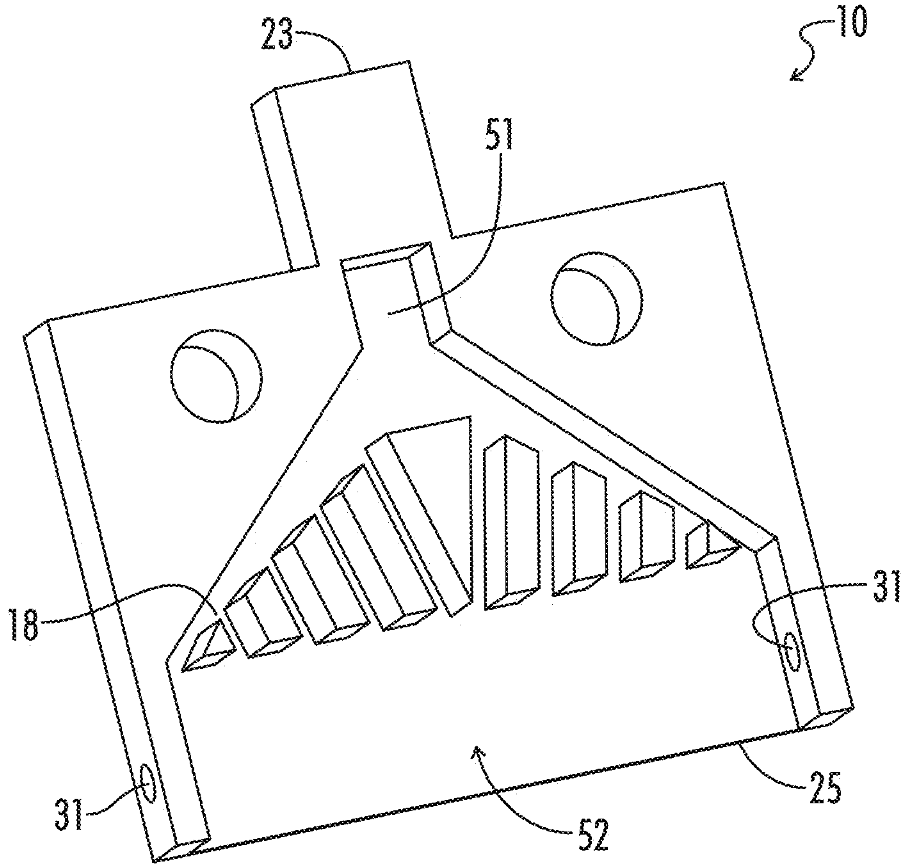
FIG. 3 is a diagram illustrating a cross-sectional view of a first embodiment of a plasma sheet source, such as is depicted by FIG. 1.
Figure 4:
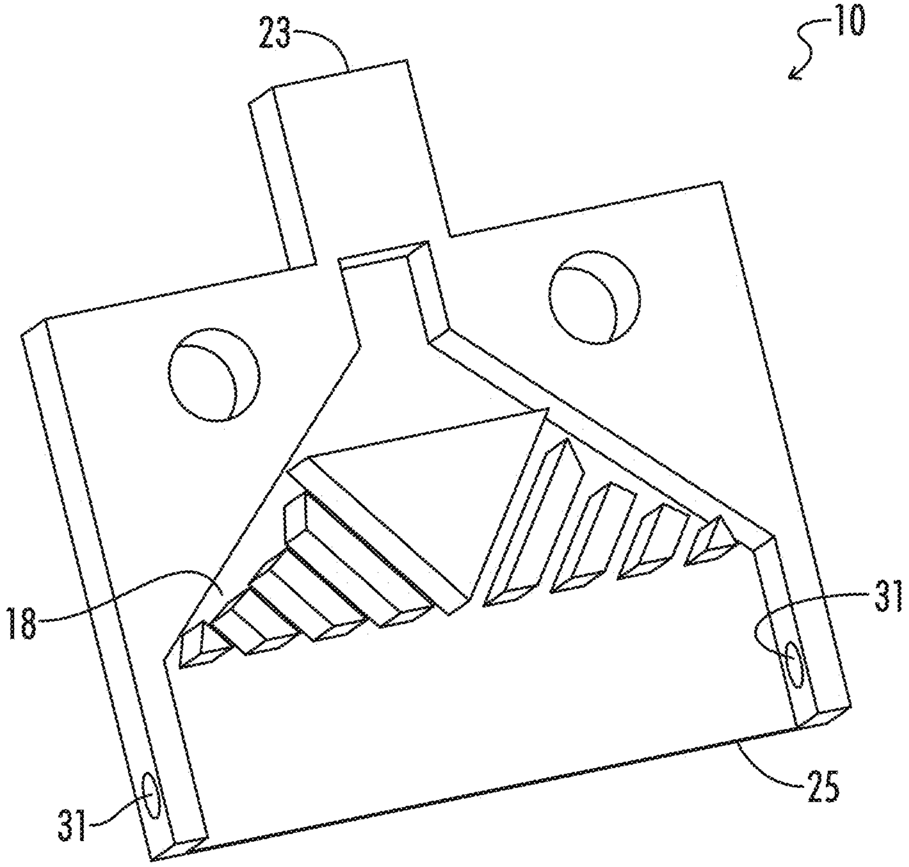
FIG. 4 is a diagram illustrating a cross-sectional view of a second embodiment of a plasma sheet source, such as is depicted by FIG. 1.

As shown in the block diagram of FIG. 2, plasma sheet source 10 includes a plurality of channels 18 and at least one electrode 20. Different embodiments of plasma sheet source 10 with different features are described below. Channels 18 are formed directly into the material of body 27 and are configured to direct gas 9 toward electrode 20. The gas flows over and past the electrode 20 toward the outlet 25, and the electrical field generated by the electrode 20 converts the gas 9 to plasma 8 as it flows through the electrical field. The dimensions and number of channels 18 may be selected and scaled based on several factors, including the desired size of plasma sheet source 10 and flow rate of gas 9. One embodiment, shown in FIG. 3, shows channels 18 as angled slots leading to electrode 20. In other embodiments, such as that depicted in FIG. 4, channels 18 are slots that are angled more toward the center of plasma sheet source 10 than those in FIG. 3. In some embodiments shown below, channels 18 consist of repeated features of varying shapes and sizes.

As shown by FIG. 3, the body 27 has a cavity 51 that receives gas 9 flow through the gas inlet 23. Pressure from at least one gas source 11 forces the gas 9 from the cavity 51 through the channels 18 into a cavity 52 in which the electrode 20 is positioned. The electrical field generated by the electrode 20 converts the gas 9 into plasma 8, which is forced out of the cavity 52 through the outlet 25 by the pressure from the gas source 11 and flow of gas 9 into the cavity 52. As shown by FIG. 3, the channels 18 may be parallel which helps to keep the plasma sheet formed in the cavity 52 uniform and homogeneous.

FIG. 2 depicts an exemplary embodiment of a system 29 that uses a plasma sheet source 10 to direct plasma toward a specimen 26. Gas 9 is provided to plasma sheet source 10 from at least one gas source 12. Gas source 12 may contain the gas 9 or a component of gas 9 in a pressurized setting. As an example, the gas source 12 may be a pressurized tank that holds the gas 9 until it is dispensed from the tank. The flow of gas 9 from gas source 12 may be modulated or otherwise controlled using a controller 14 with a valve 16 that at least partially opens to allow gas flow towards plasma sheet source 10. In this regard, when plasma is to be generated, the controller 14 controls the valve 16 so that it at least partially opens to allow gas to flow from the gas source 12 to the plasma sheet source 10. The rate of gas flow may be controlled by the extent to which the valve 16 is opened based on the pressure under which the gas 9 is contained in the gas source 12.

Note that the controller 14 may be implemented in hardware or any combination of hardware, software, and/or firmware. As an example, the controller 14 may be implemented as a field programmable gate array (FPGA) or an application-specific integrated circuit (ASIC). In some embodiments, the controller 14 may comprise one or more processors programmed with software or firmware to perform the control functionality described herein. The controller 14 also may have one or more user interfaces (not shown), such as buttons, dials, switches, keypads, display screens, or other types of devices for receiving or providing user inputs or outputs. As an example, when the plasma sheet source 10 is to be used, a user may provide a user input that causes the controller 14 to open the valve 16 to allow gas 9 to flow to the plasma sheet source 10. When use of the plasma sheet source 10 is no longer desired, a user may provide another user input that causes the controller 14 to close the valve 16, thereby stopping the flow of gas 9 to the plasma sheet source 10. Other techniques for controlling the flow of gas 9 are possible in other embodiments.

Gas 9 is ideally a noble gas, such as helium, neon, argon, or krypton, to facilitate ionization of the gas 9 by the electrical field from the electrode 20. That is, less energy is generally required to ionize noble gases relative to other types of gases. However, if desired, other types of gases 9 may be used in other embodiments. In some instances, the gas 9 may be a mixture of gasses that include at least one noble gas as the "working gas" and optionally one or more additional gasses that are application-specific. For instance, when seeds are to be treated, nitrogen gas may be mixed with a noble gas to form gas 9. In some embodiments, gas 9 is output at 2-6 L/min, though other output speeds and flow rates may be used. In some embodiments, gas flow rates may be similar to those used for conventional plasma jets. Gas 9 may be conveyed from gas source 12 to gas inlet 23 through tubing (not specifically shown in FIG. 2), such as one or more tubes that connect the gas source 12 to the valve 16 and the valve 16 to the gas inlet 23 of the plasma sheet source 10. Gas inlet 23 leads to channels 18, and thus allows gas to enter plasma sheet source 10 and reach electrode 20.

Figure 5:
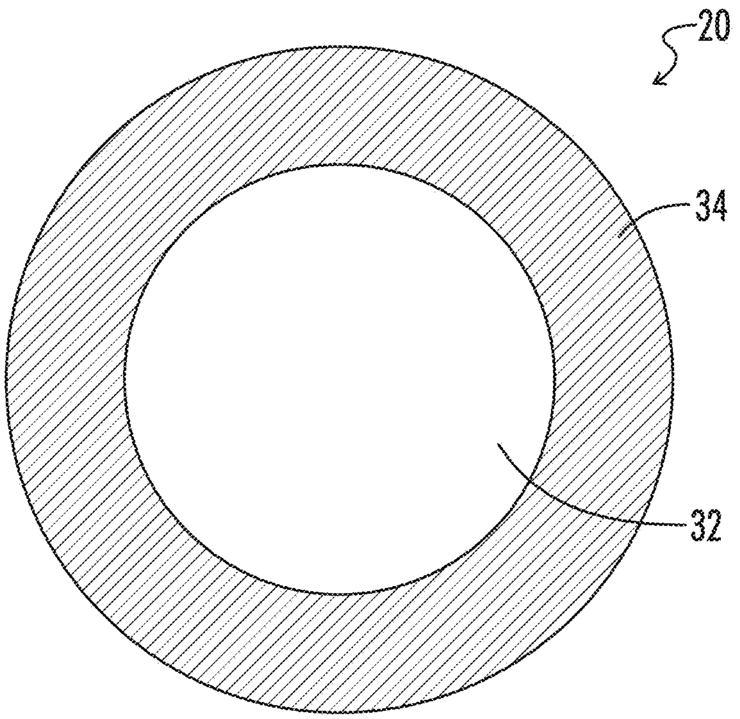
FIG. 5 is a diagram illustrating a cross-sectional view of an electrode of a plasma sheet source, such as is depicted by FIG. 1.

In some embodiments, the electrode 20 is elongated and cylindrical in shape, as shown by FIG. 5, though other electrode shapes and designs are possible in other embodiments. In FIG. 5, cylindrical electrode 20 is depicted in cross section. The electrode 20 has a conductive core 32 that is electrically connected to a power source 24 (FIG. 2), and the conductive core 32 generates an electrical field when powered by the power source 24. In FIG. 2, the power source 24 is electrically connected to the electrode 20 by one or more wires 22, but other techniques and components may be used to electrically connect the power source to the electrode 20. In some embodiments, the power source 24 provides pulsed direct current at about 1-6 kHz, though other frequencies are possible. In some embodiments, the current supplied is similar to that used in typical plasma jets. In some embodiments, the frequency of the power signal from the power source 24 is about 6 kHz at a voltage of about 6 to 10 kV, though other voltages and frequencies are possible. In addition, other types of current may be applied to the electrode for generating the electrical field in other embodiments.

The conductive core 32 is at least partially covered by dielectric covering 34 that prevents the flowing plasma 8 from contacting the core 32. In the embodiment shown by FIG. 5, the dielectric covering 34 completely surrounds the core 32. The material of dielectric covering 34 may be quartz, though other types of dielectric materials may be used in other embodiments, such as glass, ceramic, or a polymer. Using dielectric material for the covering 34 prevents plasma 8 from forming an arc with the core 34 and allows plasma 8 to remain at a lower temperature, which may be close to room temperature, or about 20° C., in some instances. Dielectric covering 34 acts as a barrier that prevents the plasma 8 from flowing to the core 32, yet the dielectric properties of the covering 34 permit the electrical field generated by the core 32 to pass without significant attenuation.

Figure 12:
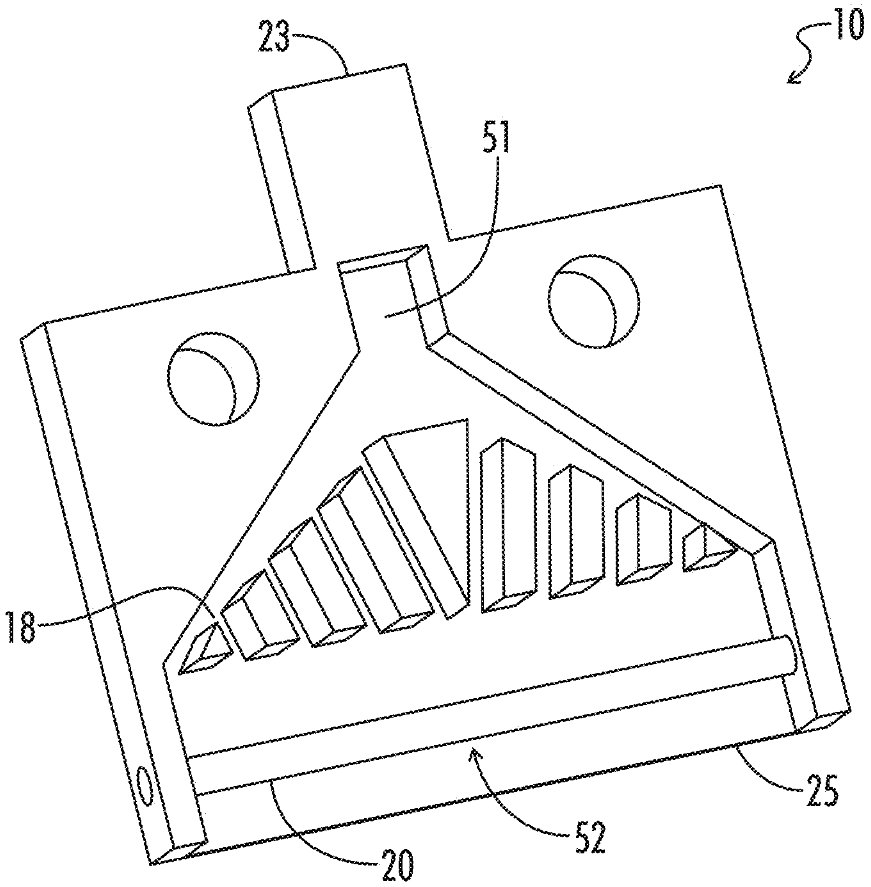
FIG. 12 is a diagram illustrating a cross-sectional view of a first embodiment of a plasma sheet source, such as is depicted by FIG. 1, with an electrode.

Electrode 20 may pass through holes 31 (FIGS. 3 and 4) in the sides of plasma sheet source 10, as shown in FIG. 12. Such holes 31 may be dimensioned such that the electrode 20 snugly fits within holes 31, and the electrode 20 may be held in place by friction between the electrode 20 and the walls of the holes 31. In other embodiments, other techniques for securing the electrode 20 to the body 27 are possible. The position of electrode 20 is such that channels 18 are above electrode 20, while plasma outlet 25 is below electrode 20. Note that electrode 20 positioning closer to channels 18 generally increases plasma neutralization before exiting through plasma outlet 25, while electrode 20 positioning closer to plasma outlet 25 generally reduces the chemical changes that are made to the surface of specimen 26. Thus, the position of electrode 20 between channels 18 and plasma outlet 25 may be selected to balance the above considerations for optimization of specimen treatment. The longitudinal axis along the length of the cylinder of electrode 20 may be parallel to the elongated plasma outlet 25 to help keep the generated plasma sheets more homogenous across the width of the outlet 25.

Figure 6:
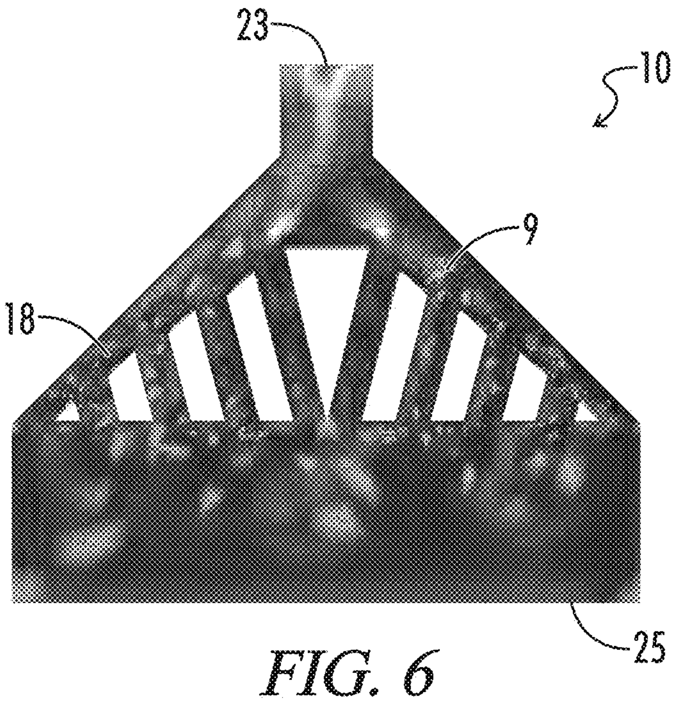
FIG. 6 is an image displaying a CFD simulation of gas flow through the plasma sheet source of FIG. 3.
Figure 7:
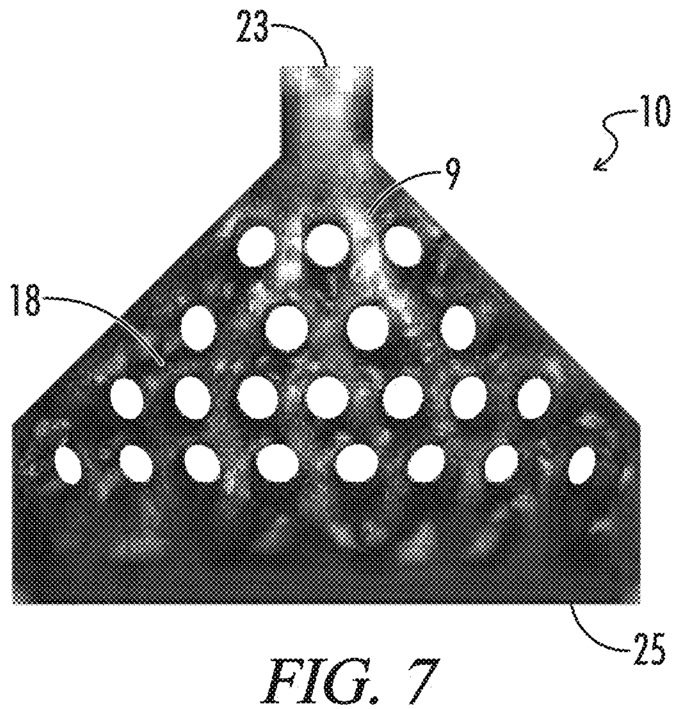
FIG. 7 is an image displaying a CFD simulation of gas flow through a third embodiment of a plasma sheet source, such as is depicted by FIG. 1.

FIGS. 6 and 7 depict computational fluid dynamics simulations of gas 9 flowing through channels 18 of embodiments of plasma sheet source 10 toward electrode 20. After reaching electrode 20, gas 9 is ionized and becomes plasma 8, which then flows to exit plasma sheet source 10 at plasma outlet 25.

Figure 8:
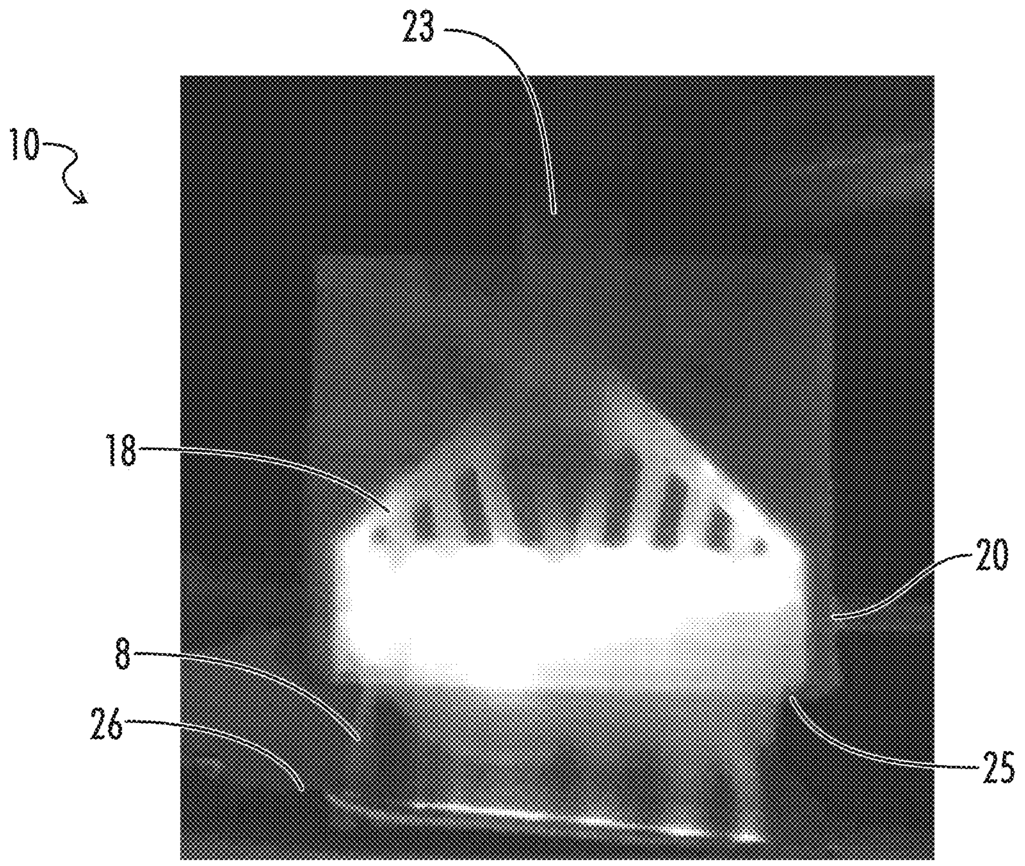
FIG. 8 is an image depicting plasma flow through the plasma sheet source of FIG. 3.

FIG. 8 shows plasma 8 exiting plasma outlet 25 and treating specimen 26. Plasma sheet source 10 is distanced between 0-1 cm from specimen 26 for treatment with plasma 8 in the form of a plasma sheet. In the embodiment shown, plasma outlet 25 has length of approximately 2 inches and a width of approximately 0.5 inches. However, other lengths and widths are possible in other embodiments. In some embodiments, the specimen 26 is kept stationary during treatment or application of the plasma sheet, with plasma sheet source 10 moved along the surface of specimen 26. However, in other embodiments, the specimen 26 may be moved (e.g., on a conveyor belt or otherwise moved) to allow treatment by a stationary plasma sheet source 10. Plasma sheet source 10 is handheld in some embodiments, while in other embodiments it is mounted and/or automated in movement and positioning.

Figure 9:
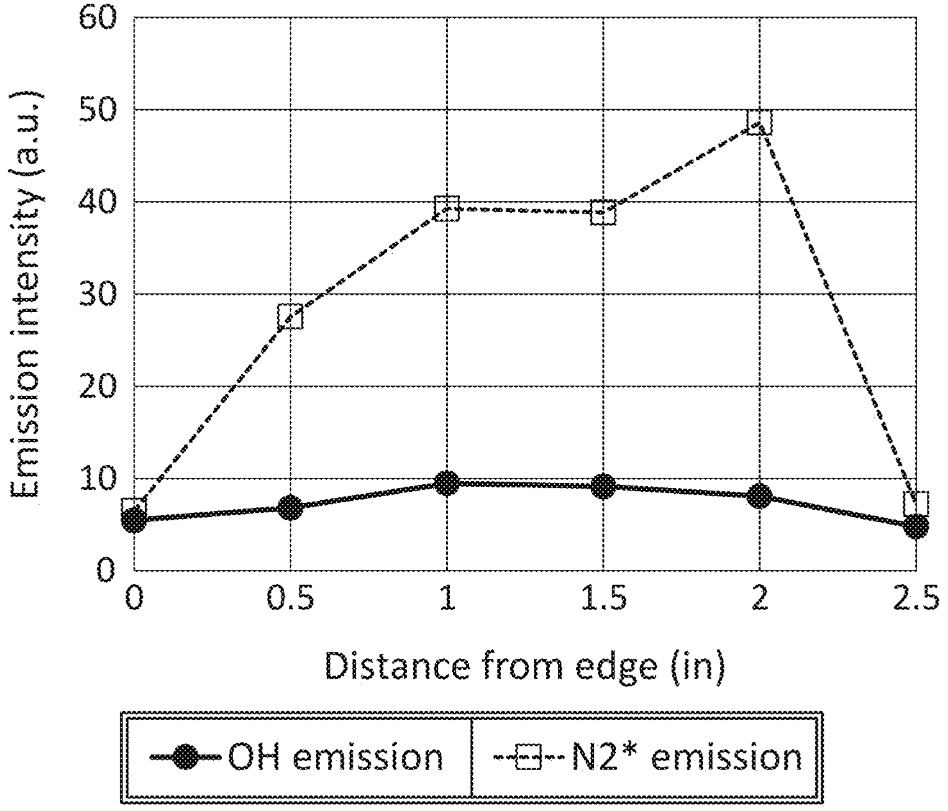
FIG. 9 is a graphical representation of OH and N2* emissions measured by spectrometry along a long edge of a plasma sheet source, such as is depicted by FIG. 1.
Figure 10:
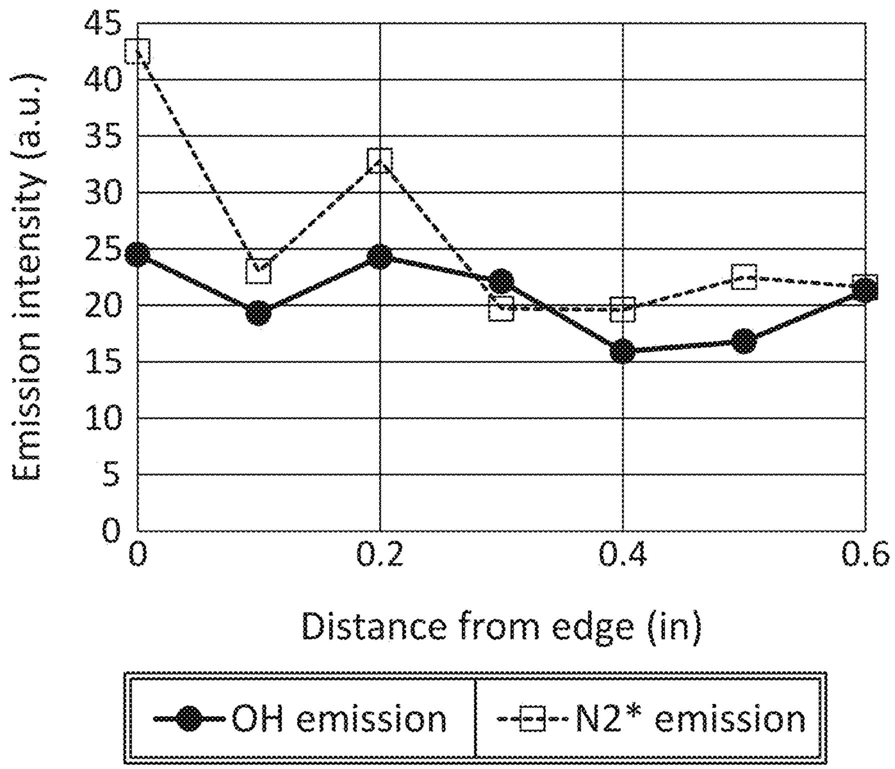
FIG. 10 is a graphical representation of OH and N2* emissions measured by spectrometry along a short edge of a plasma sheet source, such as is depicted by FIG. 1.

In FIG. 9, a graphical representation of chemical emission from treatment along a long edge of plasma sheet source 10 is shown. The length of plasma outlet 25 is 2.5 inches in FIG. 9, with higher emission intensities for OH and N2* in the center of the long edge, where coverage is generally homogenous. Near edges, treatment results in lower emissions of OH and N2*. Similarly, in FIG. 10, a graphical representation of chemical emission from treatment along a short edge of plasma sheet source 10 is shown. The width is shown from 0 to 0.6 inches, with more homogenous emissions of OH and N2* across the width relative to the homogeneity of the treatment across the length.

Figure 11:
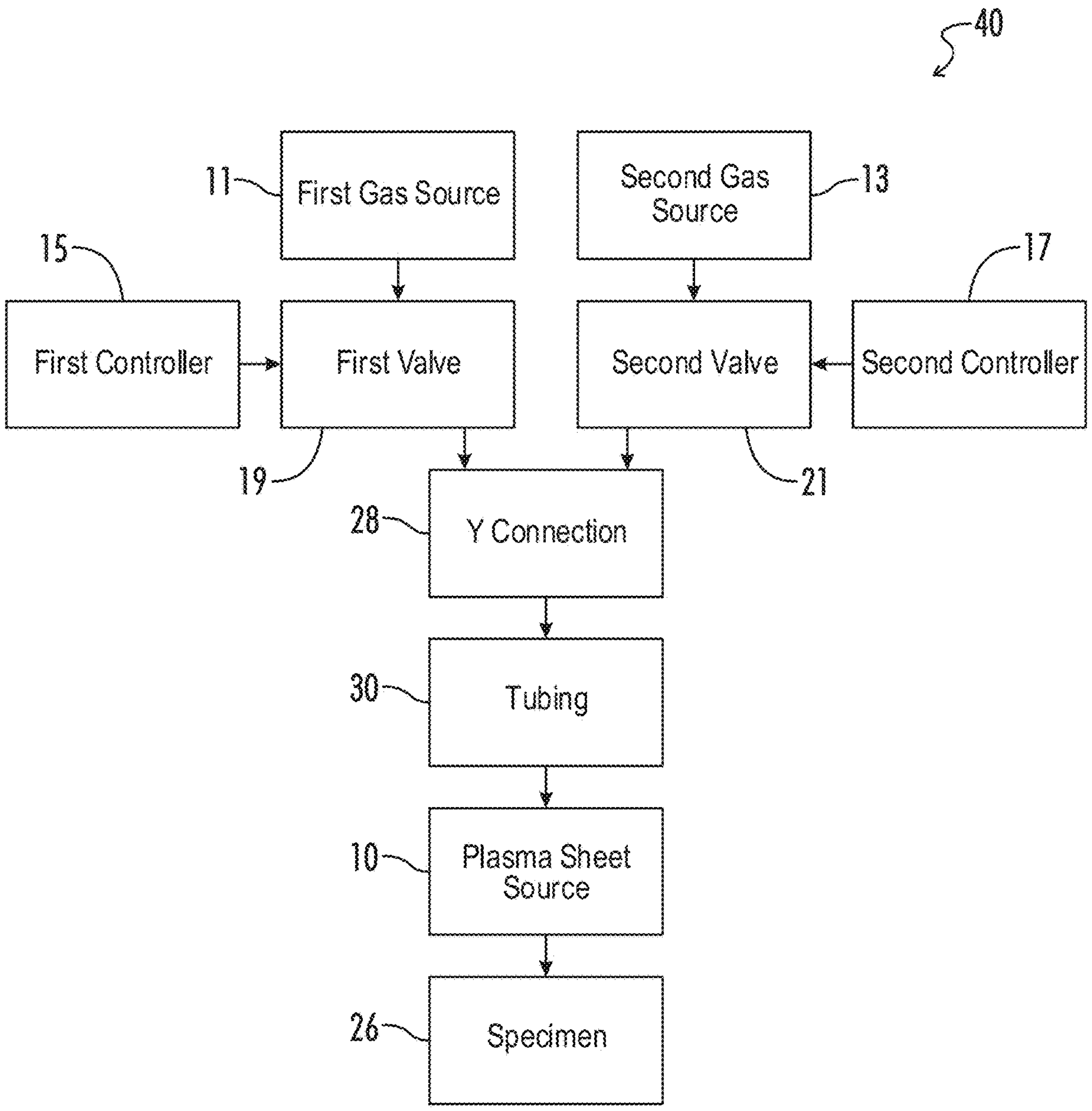
FIG. 11 is a block diagram illustrating an embodiment of a system for applying a plasma sheet to a specimen.

FIG. 11 is a block diagram depicting a system 40 that uses more than one gas 9 in the production of plasma 8 by plasma sheet source 10. The system 40 depicted in FIG. 11 includes a first gas source 11 and a second gas source 13, which store different gasses. In some cases, one gas source 11 stores a noble gas "working gas" and the other gas source 13 stores an application-specific gas, such as a gas that changes the surface properties of specimen 26. First and second gas sources 11, 13 contain gas in pressurized tanks. First gas source 11 provides gas using a first controller 15 with a first valve 19. Similarly, second gas source 13 provides gas using a second controller 17 with a second valve 21. As an example, the gas sources 11, 13 may be pressurized tanks that hold the gas until it is dispensed from the tank. The flow of gas from gas sources 11, 13 may be modulated or otherwise controlled using controllers 15, 17 with valves 19, 21 that at least partially open to allow gas flow towards plasma sheet source 10. In this regard, when plasma is to be generated, controllers 15, 17 control valves 19, 21 so that they at least partially open to allow gas to flow from gas sources 11, 13 to the plasma sheet source 10. The rate of gas flow may be controlled by the extent to which valves 19, 21 are opened based on the pressure under which gas is contained in gas sources 11, 13. The flow rates from first gas source 11 and second gas source 13 are the same in some instances and differ in other instances. Gas from each source is directed by tubing to a Y connection 28 that combines the individual gasses to one gas stream, which is to enter plasma sheet source 10 as gas 9. Gas 9 is directed from Y connection 28 to gas inlet 23 by tubing 30. Note that controllers 15, 17 may be implemented in hardware or any combination of hardware, software, and/or firmware, as described in the single gas source system above in greater detail.

Prior to entry into gas inlet 23, gas 9 is in some instances mixed so that individual component gasses are uniformly distributed. This mixing may be enhanced or facilitated using turbulence introduced by features in the interior of tubing 30 or using friction from roughened inner walls of tubing 30. Additionally, while the block diagram in FIG. 11 shows two gas sources, more than two gas sources may be used in other embodiments. In the case where multiple gas sources are used, gas streams from each may be combined into a mixture to form gas 9.

Regardless of the number of gas components making up gas 9, it is directed toward electrode 20 by channels 18 within plasma sheet source 10, as described above. After plasma 8 is produced, it may be directed to plasma outlet 25 and applied to specimen 26 as a plasma sheet.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

We claim:

1. A plasma sheet source, comprising:
a gas inlet for receiving gas;
an elongated outlet;
an electrode comprising a conductive core covered with a dielectric material, the electrode configured to generate an electrical field; and
a body having a plurality of channels for directing gas from the gas inlet through the electrical field generated by the electrode to the elongated outlet, such that the electrical field converts the gas exiting the plurality of channels to a plasma sheet output that exits the body via the elongated outlet.

2. The plasma sheet source of claim 1, wherein the gas includes a noble gas.

3. The plasma sheet source of claim 1, wherein the dielectric material is quartz.

4. The plasma sheet source of claim 1, wherein the body has a first cavity for receiving gas from the gas inlet and a second cavity in which the electrode is located, and wherein each of the channels extends from the first cavity to the second cavity.

5. The plasma sheet source of claim 1, wherein the plurality of channels includes at least a first channel and a second channel, and wherein the first channel is parallel to the second channel.

6. The plasma sheet source of claim 1, wherein the electrode is elongated and has a longitudinal axis that is parallel with the elongated outlet.

7. The plasma sheet source of claim 1, wherein the electrode is electrically connected to a power source configured to transmit pulsed direct current to the electrode.

8. The plasma sheet source of claim 1, wherein the plasma sheet is at room temperature.

9. The plasma sheet source of claim 1, wherein the plasma sheet source is configured to form the plasma at atmospheric pressure.

10. The plasma sheet source of claim 1, wherein the plasma sheet output is uniform.

11. A system for generating a plasma sheet, comprising:
at least one gas source;
a power source; and
a plasma sheet source connected to the gas source, the plasma sheet source having an electrode and a plurality of channels positioned to receive gas from the at least one gas source and to direct the gas toward the electrode and through an electrical field generated by the electrode, wherein the electrode is connected to the power source and the power source is configured to apply power to the electrode for generating the electrical field at a strength sufficient for converting the gas exiting the plurality of channels into the plasma sheet that egresses the plasma sheet source through the elongated outlet, and wherein the electrode has a conductive core covered with a dielectric material.

12. The system of claim 11, wherein the gas includes a noble gas.

13. The system of claim 11, wherein the dielectric material is quartz.

14. The system of claim 11, wherein the plasma sheet source has a first cavity for receiving the gas and a second cavity in which the electrode is positioned, and wherein the plurality of channels includes at least a first channel and a second channel, and wherein each of the first channel and the second channel extends from the first cavity to the second cavity.

15. The system of claim 14, wherein the first channel is parallel to the second channel.

16. The system of claim 11, wherein the electrode is elongated and has a longitudinal axis that is parallel with the elongated outlet.

17. The plasma treatment system of claim 11, wherein the power source is configured to apply pulsed direct current to the electrode.

18. The plasma treatment system of claim 11, wherein the plasma sheet source is configured to form the plasma at atmospheric pressure.

19. The system of claim 11, wherein the plasma sheet egressing the plasma sheet source through the elongated outlet is uniform.

20. A method for generating a plasma sheet, comprising:

receiving gas at an inlet of a first cavity of a plasma sheet source having a plurality of channels;

generating an electrical field with an electrode in a second cavity of the plasma sheet source, wherein the second cavity is positioned adjacent to an end of the plurality of channels opposite the inlet;

directing the gas from the inlet through the plurality of channels to the electrode in the second cavity such that the electrical field generated by the electrode converts the gas into the plasma sheet; and emitting the plasma sheet from the plasma sheet source through an elongated cavity.

21. The method of claim 20, further comprising directing the plasma sheet to a specimen for treating the specimen.

22. The method of claim 21, wherein the specimen is a biological specimen.

23. The method of claim 20, wherein the electrode is elongated and has a longitudinal axis that is parallel with the elongated outlet.

24. The method of claim 20, wherein the electrical field is generated using pulsed direct current.

25. The method of claim 20, wherein the plasma sheet emitted from the plasma sheet source through the elongated cavity is uniform.

* * * * *